C. G. HOOVER.
TIRE MAKING METHOD AND APPARATUS.
APPLICATION FILED JULY 3, 1918.
1,435,895. Patented Nov. 14, 1922.
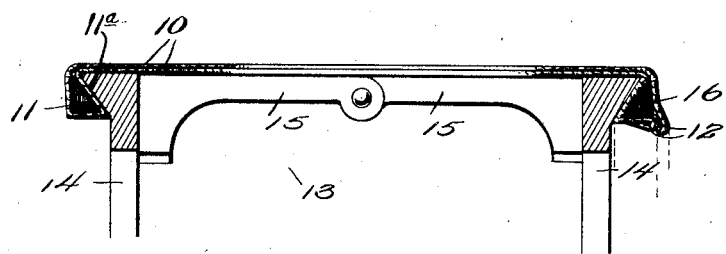
FIG. 1.
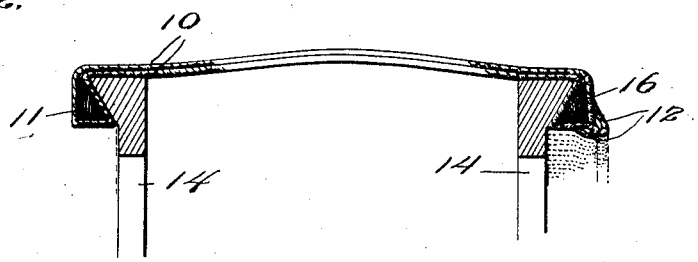
FIG. 2.
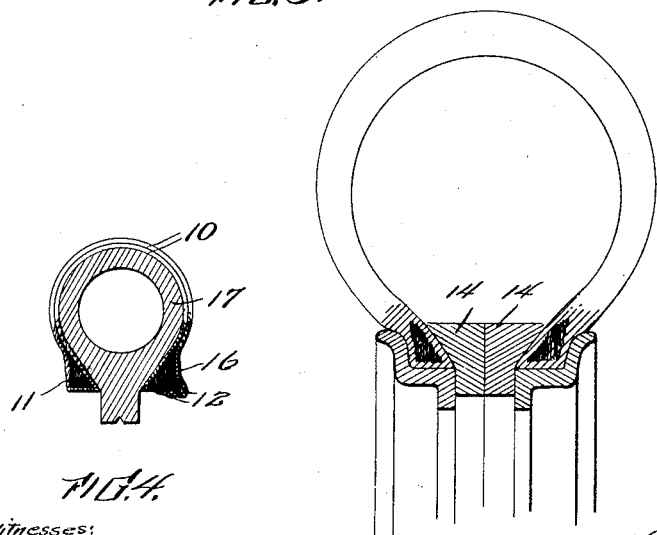
FIG. 3.
FIG. 4.
Inventor
CLAIR G. HOOVER.

Patented Nov. 14, 1922.

1,435,895

UNITED STATES PATENT OFFICE.

CLAIR G. HOOVER, OF AKRON, OHIO, ASSIGNOR TO THE GOODYEAR TIRE & RUBBER COMPANY, OF AKRON, OHIO, A CORPORATION OF OHIO.

TIRE-MAKING METHOD AND APPARATUS.

Application filed July 3, 1918. Serial No. 243,132.

*To all whom it may concern:*

Be it known that I, CLAIR G. HOOVER, a citizen of the United States, residing at Akron, in the county of Summit and State of Ohio, have invented new and useful Improvements in Tire-Making Methods and Apparatus, of which the following is a specification.

My present invention relates to improvements in combination bull ring and tire supports used in the manufacture of pneumatic tires of the cord blanket type and to the method practiced through the use of these devices.

A popular method of building tires of this type consists of laying the cord reinforcement for the tire upon a core as a folded blanket which embraces one of the beads. The border or free ends of the cord reinforcement terminate in a series of loops which are next fastened around the other bead. This method is somewhat objectionable as there is no slack permitted which may be utilized in securely fastening the looped ends of the cord reinforcement around the bead.

The present invention comprehends the use, in place of the usual core, of a tire support upon which the cord reinforcement is laid as in the previously described method and obtaining through the use of the support a slack in certain previously tensioned portions of the cord reinforcement, whereby the positioning of the beads, and the fastening of the edges of the blanket, may be accurately and expeditiously accomplished, as will hereinafter become apparent.

The component parts of my proposed support may be later used to form the so-called bull ring used by some manufacturers in curing the finished tire.

The above and additional objects of a similar nature, which will be hereinafter more specifically treated, may be accomplished by such means as are illustrated in the accompanying drawings, described in the following specification, and then more particularly pointed out in the claims which are appended hereto and form a part of this application.

With reference to the drawings, wherein there has been illustrated a preferred embodiment of the invention as it is reduced to practice, and throughout the several views of which, similar reference numbers designate corresponding parts:

Fig. 1 represents a diagrammatic illustration of my improved support with the cord reinforcement arranged thereupon;

Fig. 2 is a similar view with the central support removed allowing a slack to be formed between the two outer portions;

Fig. 3 shows my improved support as used in curing as a bull ring; and

Fig. 4 is a sectional view illustrating the old method of building tires of this type.

The cord reinforcement designated as 10 in the drawings, is previously laid up in any suitable manner in a blanket form with its free edges terminating in a series of loops 12. The blanket 10 is then placed upon a support designated generally as 13, which consists of a pair of annular rings 14 held in spaced relation by central spacing members 15 in the manner shown in Fig. 1. Preferably these rings are spaced apart to provide a support approximating in width one-half of the width of the blanket before it is folded, for a purpose presently apparent. Each ring 14 is provided with an annular edge flange formed with an inclined side face 11$^a$, which, together with the periphery of each ring, may be coated with cement or other adhesive as desired.

The blanket is preferably first attached to a support 13 by placing that portion adjacent one of its looped edges in contact with the cement coated side face and periphery of one of the rings 14, preferably, as shown in the drawing, the right hand one. It is next stretched across to the opposite or left hand ring 14 where its medial portion is disposed in contact with the cement covered portions thereof. In this position, approximately one half of the blanket is free from actual contact with the support 13 and the loops of the attached edge of the blanket are free from the cement coated portion of the contiguous ring. Obviously, one half of the blanket is now held under tension upon the support 13. Cement coated beads, designated 11 and 16 respectively, are now applied against those portions of the blanket in contact with the side face 11$^a$ of each ring. These beads may be applied either simultaneously, or one at a time, but these procedures may be varied, by applying the bead 16 before the medial portion of the blanket is arranged upon the ring 14, also, if desired, the bead 11 may be positioned upon the blanket before the blanket is placed upon the support 13. In actual practice, however, the preferred procedure is to apply the bead 11 first while the blanket is under tension. The members 15 are now removed which permits the rings 14 to approach one another, thus creating a slack in the supported portion of the blanket. The free portion of the blanket is next folded over the bead 11 and the looped edges of the blanket adjusted into alignment, whereupon, the bead 16 is inserted between them in the position illustrated in Figure 1, and the looped edges secured in interlocking relation in any suitable manner, such as by tying. It will be apparent that these latter steps of my method may also be varied, for instance, the bead 16 may be applied before the free portion of the blanket is folded over, and the members 15 may not be removed until after the bead 16 is applied.

After the foregoing steps have been completed, the central spacing members 15 of the support may be again inserted and the requisite finishing strips of the carcass applied. In Fig. 3 of the drawings, I have illustrated how the two ring portions are positioned when they constitute the complete bull ring as used in curing or vulcanizing.

Fig. 4 illustrates the old method as before described wherein 17 designates the annular core upon which the blanket is formed. It will be observed upon reference to this figure, that after the blanket is once positioned on the core, there is no way to relieve the tension upon the cord reinforcement to permit the looped ends of the blanket to encircle the free bead as the only movement the beads can have (due to the nature and formation of the bead) is a lateral movement, as will be understood.

Thus it will be seen that in providing a support of the class described, I have overcome the difficulties experienced in the old methods of building tires of this type and have provided a support that may later be used to facilitate in vulcanizing the tire.

The foregoing method may be practiced, and the apparatus used, with equally satisfactory results in building cord tires embodying more than two plies, or blankets, as will readily be apparent, and it is to be understood that other variations in the procedure, in addition to those previously set forth, may be resorted to without departing from the spirit of the invention.

What I claim is:

1. The method of building tires that comprises, fabricating a cord blanket, tensioning a portion of the blanket, positioning a bead at approximately the medial portion of the blanket, positioning a second bead at one edge of the blanket, releasing the tension upon the blanket, and folding the blanket upon itself to enclose the beads therein.

2. The method of building tires that comprises, fabricating a cord blanket, tensioning a portion of the blanket, positioning a bead at approximately the medial portion of the blanket, positioning a second bead adjacent one edge of the blanket, releasing the tension upon the blanket, folding the blanket upon itself to enclose the beads, and securing the edges of the blanket together.

3. The method of building tires that comprises, fabricating a cord blanket, tensioning a portion of the blanket, positioning a bead at approximately the medial portion of the blanket, positioning a second bead at one edge of the blanket, releasng the tension upon the blanket, folding the blanket upon itself to enclose the beads therein, tensioning the folded blanket, building up the carcass finishing elements thereon, and vulcanizing and molding the structure thus formed.

4. The method of building tires that comprises, fabricating a cord blanket, tensioning a portion of the blanket, positioning a bead at approximately the medial portion of the blanket, positioning a second bead at one edge of the blanket, releasing the tension upon the blanket, folding the blanket upon itself to enclose the beads therein, tensioning the folded blanket, building up the carcass finishing elements thereon, and vulcanizing under internal pressure the structure thus formed.

5. The method of building tires that comprises, fabricating a blanket of cord elements, said elements having looped edges, tensioning a portion of the blanket, positioning a bead at approximately the medial portion of the blanket, releasing the tension upon the blanket, folding the blanket to enclose the bead, aligning the looped edges of the blanket, positioning a second bead between the aligned edges thereof, and tying said looped edges together to enclose the second bead.

6. An apparatus of the character described for use in the building of cord tire carcasses in the manner specified, comprising a pair of side-rings, and removable spacing means positionable between the rings for maintaining them in separated relation, said spacing means being adapted for withdrawal from between the side-rings whereby the side-rings may be brought into abutting and mating relation to form a bull-ring.

7. An apparatus of the character described for use in the building of cord tire carcasses in the manner specified, comprising a pair of side-rings, each of which has an external inclined shoulder adapted to form the button for the tire bead, and movable spacing means positionable between the rings for maintaining them in separated relation, said spacing means being adapted for withdrawal from between the side-rings, whereby the side-rings may be brought into abutting and mating relation to form a bull-ring.

In witness whereof, I have hereunto signed my name in the presence of two subscribing witnesses.

CLAIR G. HOOVER.

Witnesses:
B. J. McDANEL,
R. S. TROGNER.